United States Patent

[11] 3,592,054

[72] Inventors Donald R. Stewart;
 Howard B. Dutro, both of Denver, Colo.
[21] Appl. No. 784,849
[22] Filed Dec. 18, 1968
[45] Patented July 13, 1971
[73] Assignee Teledyne Industries, Inc., Los Angeles, Calif.

[54] STRUCTURAL LOAD CELL
 11 Claims, 8 Drawing Figs.
[52] U.S. Cl. ........................................ 73/141
[51] Int. Cl. ........................................ G01e 5/00
[50] Field of Search ............................ 73/141 A, 141, 88.5, 398 R; 338/1—8

[56] References Cited
UNITED STATES PATENTS

| | | | |
|---|---|---|---|
| 3,095,551 | 6/1963 | Hebert | 73/141 |
| 3,199,057 | 8/1965 | Gindes et al. | 338/5 |
| 3,210,993 | 10/1965 | Shoor et al. | 73/141 |
| 3,353,409 | 10/1967 | Gelbach | 73/398 |
| 3,221,557 | 12/1965 | Li et al. | 73/406 |
| 3,439,541 | 4/1969 | Gilder | 73/398 |
| 3,422,445 | 1/1969 | Jacobsen | 73/141 |
| 3,461,715 | 8/1969 | Stover | 73/141 |
| 2,488,347 | 11/1949 | Thurston | 201/63 |
| 2,813,958 | 11/1957 | MacDonald | 201/63 |
| 3,088,083 | 4/1963 | Ward | 338/5 |
| 3,210,993 | 10/1965 | Shoor | 73/141 |

FOREIGN PATENTS

| | | | |
|---|---|---|---|
| L20,726 | 8/1956 | Germany | 73/141 |
| 472,669 | 12/1967 | Switzerland | 73/141 |
| 74,057 | 4/1949 | Netherlands | 73/141 |
| 3,210,993 | 10/1965 | U.S.S.R. | 73/141 |

Primary Examiner—Richard C. Queisser
Assistant Examiner—John Whalen
Attorney—Van Valkenburgh and Lowe ABSTRACT: A load cell, a cylindrical tube having disc-shaped caps closing the ends thereof, strain gages at the inner wall of the tube and a cylindrical connector block within the tube to which the caps are connected. The ends of the tubes are slightly bevelled to provide a linelike contact with the caps adjacent to the inner wall of the tube at small loads, but a full surface contact at design loads. The resulting strain pattern on the strain gages provided for more sensitive measurements at the smaller loads. The height of the connector block is selected to provide a small clearance between it and the end caps at normal design loads. However, when the cell is overloaded the end caps bottom against the connector block so that the connector block cooperates with the tube to resist the excess load.

PATENTED JUL13 1971

3,592,054

INVENTORS
Donald R. Stewart
BY Howard B. Dutro

Van Valkenburgh & Lowe
ATTORNEYS 3,592,054

STRUCTURAL LOAD CELL

This invention relates to load-indicating devices and more particularly to load cells of the type which support and measure the loads upon support structures. The invention is concerned with the use of load cells for steel columns and struts which are used in connection with underground excavation to hold the roof and sidewall formations and overburden in place during excavation operations. although such load cells are also used for many other purposes.

In excavation work when columns and struts are used to hold overburden, the loading on the columns and struts cannot be determined ahead of time for such loading may vary considerably. Thus, it is desirable to seat such columns and struts upon load cells which record the loads and variations of load upon these members. The information obtained is often essential for subsequent engineering design purposes and also, the load cells will provide advance warning should earth movements be occurring which could not otherwise be detected, but which could eventually bring about an ultimate collapse of the steel columns.

The load cells used for such purposes are formed as short, rugged cylinders and the improved type herein disclosed consists of a short, thick tube closed at each end by a cap. These cells will vary in diameter depending upon the load which they are designed to sustain, for example, an 8 inch diameter load cell of the tube-cap type herein disclosed can support a load exceeding 600,000 pounds.

The magnitude of the load upon such a cell is determined by measurement of the elastic deformation of the cell itself by very sensitive strain gages mounted upon or within the cell. Such strain gages are used to measure the flexure of the cell, preferably in the direction of the compressive force, parallel to the axis of the cell and also transversely thereto. When using the tube-cap load cell herein disclosed, a preferred arrangement provides for 12 strain gages mounted as crossed pairs at 60° spacings about the inner wall of the tubular shell as a sextette of pairs.

The strain gages may be of various types and they are electrical devices which measure very small movements through changes of resistance, inductance or capacitance in an electrical circuit having leads connecting with the gage and extending to a readout device at any suitable remote location. One popular type of strain gage consists of a rectangular tab carrying a fine wire at its contact surface which is looped to form a series of spaced, parallel reaches along the tab. The contact surface of the tab is securely cemented to the inner wall of the tubular shell and the wires will lengthen or shorten in an elastic manner responsive to the elastic movements of the cell. The changes of resistance to the wire responsive to such movements is measured by a delicate bridge-type circuit at the readout instrument. When strain gages are thus mounted within a load cell, the cell can be calibrated in a testing machine and thereafter, the calibration data usually presented in the from of curves on charts, can be used to accurately determine the magnitude of loads and the changes of loading on a column supported by the cell.

The present invention was conceived and developed to meet the need for improvements in the construction and operation of such load cells. In the first place, although the cells appear to be heavy, rugged units, they are actually comparatively delicate instruments. If the cell is dropped or struck with a heavy object, the resulting shock can alter the calibration of the load cell. While such mishandling of the cells should be avoided, the cell may nevertheless be subjected to severe shocks resulting from blasting operations which may be necessary at a location near their installation. Accordingly, an object of the invention is to provide a novel and improved load cell which is better able to withstand severe shocks.

Another need resides in increasing the effective range of a load cell wherein small loads, considerably less than the capacity of the cell, can be measured with the same relative precision as is possible when the cell is measuring a full load. Not only does this reduce the number and sizes of load cells which will be needed for a given project, but also whenever a column is supporting overburden, the load on the column can vary considerably and it is important to observe the smaller loads and variations of such smaller loads with a higher degree of sensitivity than when observing large loads and variations of such larger loads. Thus, another object of the invention is to provide a novel and improved load cell having an increased range of being capable of measuring comparatively small loads with a higher degree of sensitivity than that attained when measuring larger loads which are near the capacity of the cell.

A further need resides in providing a means in a load cell which will permit the cell to be overloaded greatly beyond its normal capacity without damaging the cell and with the cell still remaining functional. For example, should the load upon a column supporting overburden increase to an amount far in excess of the expected load and beyond the capacity of the cell, it is still desirable to provide means for indicating the magnitude of such a load and of course, desirable to permit the cell to withstand the excess without being damaged. Thus, another object of the invention is to provide a novel and improved cell which is capable of withstanding and measuring loads greatly in excess of the design capacity of the cell.

Other objects of the invention are to provide a novel and improved load cell which is a simple, neat appearing, economical, rugged and durable unit.

With the foregoing and other objects in view, all of which more fully hereinafter appear, my invention comprises certain constructions, combinations and arrangements of parts and elements as hereinafter described, defined in the appended claims and illustrated in the accompanying drawing, in which:

The essential features of the invention include improvements in a load cell whose primary component is a short, thick-walled tube which is closed by a bearing cap at each end. The ends of the tube are slightly bevelled to contact the bearing caps as a narrow seat or an approximate line contact about the inner circular edge of the tube whenever the cell is resisting loads which are significantly less than the loads for which the cell is designed to withstand, but to permit a full surface contact whenever the cell is resisting design loads. Each bearing cap includes a short, cylindrical stub which projects into the load cell tube and this stub is centered and sealed in the tube by an O-ring. A heavy, cylindrical connector within the cell holds the bearing caps in place upon the tube ends, by a ring of bolts through each cap and into the connector. The end surfaces of the connector are planed and square to lie in spaced parallelism with the inner surfaces of the end caps. A small clearance is provided between these adjacent surfaces to permit flexure of the load cell tube under the design loads without interference by the connector. However, this clearance is selected in such a manner as to permit the inner surfaces of the end caps to contact the ends of the connector whenever the loading exceeds the design loads of the cell to enable the cell to withstand excessive loads without being damaged.

Figure 1:
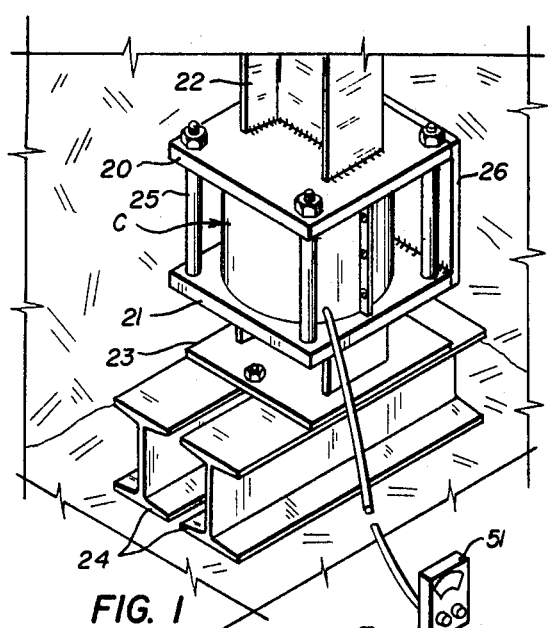
FIG. 1 is a perspective view of a column mounted adjacent to an excavation face showing an improved load cell in the column and indicating diagrammatically a readout meter connected to the load cell at a remote location, this figure being indicative of a typical environment wherein a load cell is used.
Figure 2:
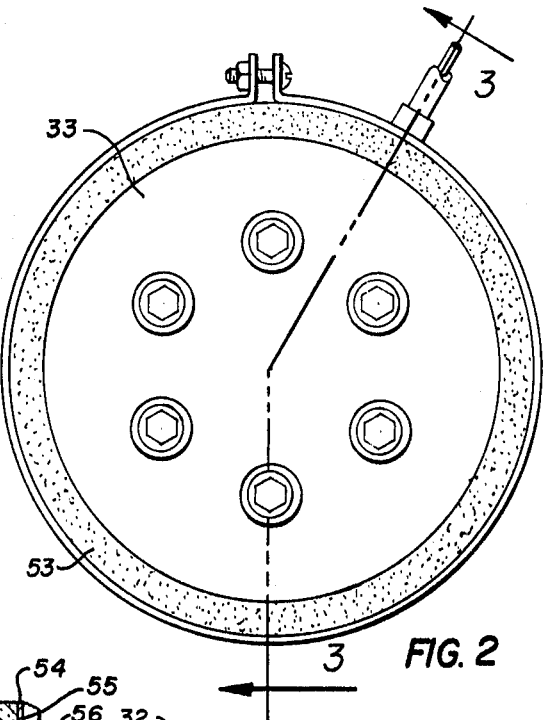
FIG. 2 is a plan view of the improved load cell per se.

Referring more particularly to the drawing, FIG. 1 shows a typical installation of a support column wherein an improved load cell C is mounted, as between a pair of substantially square bearing plates 20 and 21. These bearing plates are spaced apart in a cutout portion of the column 22 near it bottom end and will be welded to the column members. The bottom of the column is mounted upon a base plate 23 which, in turn, is bolted to footing beams 24. The two bearing plates are interconnected by bolts 25, near the respective corners thereof, to secure the load cell between them in such a manner as to provide a continuity of loading on the column 22. To complete the assembly, one or more shield plates 26 may be welded to the lower bearing plate to upstand from an edge thereof to protect the load cell from flying rock whenever blasting operations are under way at locations as indicated at FIG. 1.

Figures 5, 6, 7:
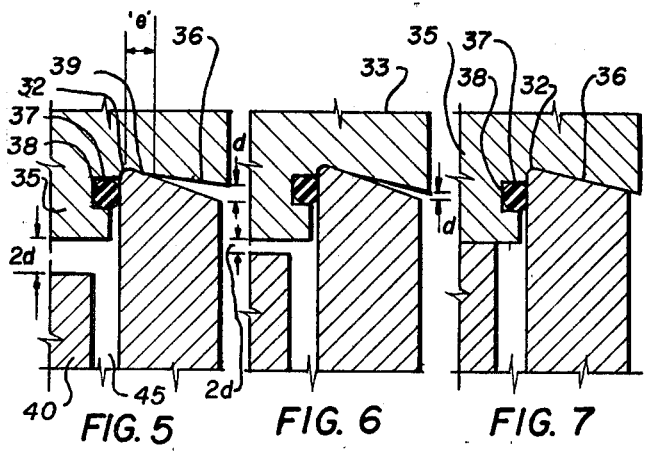
FIG. 5 is a fragmentary sectional portion of the cell as taken from the indicated line 5-5 at FIG. 3, but on a greatly enlarged scale and with the sloping portions and spacings of portions of the cell being exaggerated to better indicate the construction thereof.
FIG. 6 is a fragmentary sectional portion of the cell similar to FIG. 5, but showing the interrelationship of the components of the cell when the cell is being subjected to loads for which it was designed.
FIG. 7 is a fragmentary sectional portion of the cell similar to FIG. 5, but showing the interrelationship of the components of the cell when the cell is being subjected to excessive loads.

The load cell tube 30, the primary load indicating member of the load cell, is a short, thick-wall tubular member having each end 31 planed at a slight bevel, approximately one-half degree, to provide a slight ridge 32 adjacent to the internal cylindrical wall of the tube. The ends of this tube are closed by an upper cap 33 and lower cap 34 and each cap is formed as a thick, disc-shaped member having an outside diameter as large as or slightly larger than the diameter of the load tube 30. Each cap is formed with flat, parallel surfaces and the inward face of each includes a short, cylindrical stub 35 having a diameter approximately one-sixteenth inch less than the diameter of the internal cylindrical wall of the tube 30 to permit the stub to project into the tube with a loose fit. The annular shoulder 36, outwardly from the stub of each cap, is finished as a flat, planar surface to receive an end 31 of the cell 30. The juncture between the shoulder 36 and the wall of the stub 35 is formed as a laterally inset annular groove 37 proportioned to receive and hold an O-ring 38. Each O-ring 38 fits in its groove 37 and against the inner surface of the cell tube 30 to hold the stub centered in the tube, to effect a seal and to aid in relieving lateral shocks which might otherwise be transmitted between the tube and cap. As indicated at FIG. 5, it is to be noted that each tube ridge 32 is pressed against its shoulder to form an indentation 39 in the surface of the shoulder 36. Also, the surface of the shoulder 36 and the outer portion of the end of the tube 30 are separated a distance $d$ as indicated at FIG. 5 and as hereinafter further described.

A short connector 40, which is preferably a thick walled, tubular member as illustrated, is proportioned to loosely fit within the tube 30 when it is closed by the caps 33 and 34. This tube may be held in a centered position between the end caps by bolts 41 in a ring of holes 42 in each cap, or it may rest upon the bottom cap 34. When centered, the small gap between the top of this connector and the bottom of the top end cap stub 35 is indicated as $d$ at FIGS. 5 and 6. A similar gap $d$ will occur between the bottom of the connector and the top of the bottom end cap stud making the total gap $2d$. This connector 40 is held in an axially centered position with respect to the tube 30 by the circular array of bolts 41, at each end thereof, which extend through holes 42 in each cap 33 and 34, and into tapped holes 43 through the connector which are in registration with the holes 42. The holes 42 in each cap are countersunk at their outer faces, as at 44, to receive the heads 45 of the bolts so that the outer surfaces of the caps will rest flatly against the bearing plates 20 and 21 when the load cell is mounted in position between them.

Figures 3, 4:
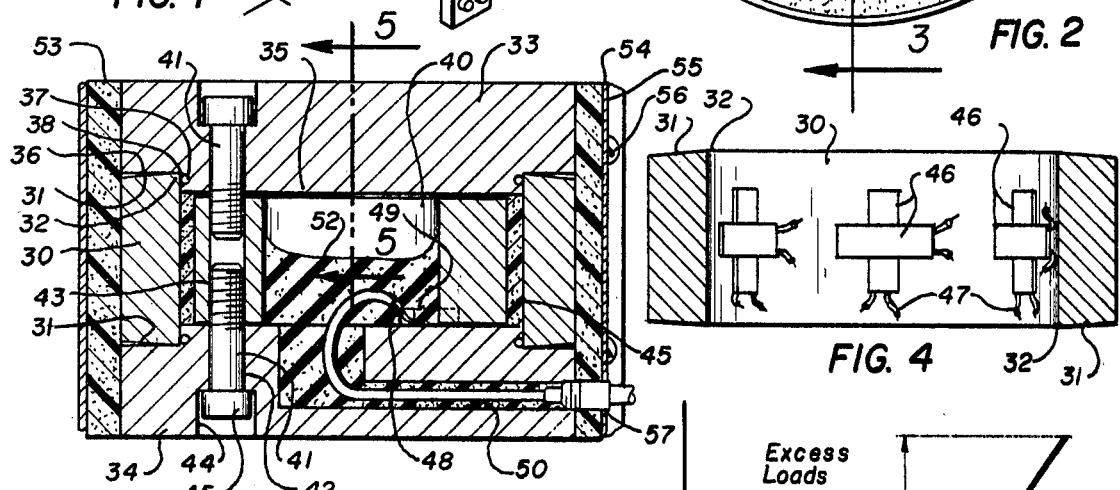
FIG. 3 is a sectional elevational view of the load cell as taken from the indicated line 3-3 at FIG. 2.
FIG. 4 is a sectional elevational view of the load tube of the cell, showing a pair of strain gages mounted on the inner wall thereof.

The annular space 45 between the inner wall of the load tube 30 and the outer cylindrical wall of the connector is preferably at least one-fourth inch to provide a sufficient clearance for the mounting of strain gages 46 on the inner wall of the tube 30. Each strain gage 46 is formed as a flat, rectangular tab having wire leads 47 extending from one end thereof. These gages are adapted to be cemented upon the inner wall of the tube by using a selected resin adhesive which will become quite hard when it sets so that the small wires within the gage will deflect with the deflection of the load cell, and one preferred arrangement which accounts for any eccentricity in loading is to provide six pairs of gages in a crossed, lapped pattern as illustrated, and at 60° spacings about the load tube 30. The leads 47 of these gages are joined together and to leads 48 of a shielded conduit. This conduit extends through a passageway 49 in the connector to the center thereof and thence through a lateral conduit 50 in the lower cap 34 and thence to a readout instrument 51 as indicated at FIG. 1. After the strain gages are mounted in position and wired to the leads of the conduit 48, the connector 40 is positioned within the load cell with the bottom cap in place. The annular space 45, between the tube 30 and the connector, is then filled with a potting material such as polyurethane. Also, the inside of the tubular connector 40 is partially filled with a similar potting material 52 as indicated at FIG. 3. This potting provides a continuity through the cell to reduce undesirable effects of shock attenuation.

The cell is preferably insulated from laterally directed shock waves by embracing it within a sleeve 53 of a resilient, closed-pore foam which is held in position by a thin-walled, cylindrical clamp 54 extending about the foam sleeve. The foam sleeve 53 preferably extends completely about the cylindrical surface of the load cell C the full height thereof to cover the tube 30 and the edges of the caps 33 and 34. The clamp 53 holding this sleeve in place is a straplike member adapted to be wrapped around the sleeve. It has a width slightly less than the height of the load cell. It is provided with flanges 55 at its ends which are spaced apart a short distance when wrapped about the sleeve. Spaced, opposing holes in these flanges receive bolts 56 to permit the clamp to be tightened upon the sleeve to a snug fit. A hole 57 is provided near the bottom edge of the clamp through which the conduit 50 extends.

Before the load cell C is used at a field installation, it must be calibrated so that readings obtained on the instrument 51 will indicate the actual load upon the cell. It was discovered that the arrangement herein described, the six pairs of strain gages about the inner wall of the tube 30, would compensate for eccentricities of loading upon the cell which are sometimes unavoidable at field installations, therefore, the cell C and its readout instrument 51 can be reliably calibrated in a laboratory testing machine having sufficient capacity for the purpose. The calibration procedure is to apply specified compressive loads onto the load cell and at the same time obtain meter readings on the readout instrument 51. The data so obtained may be depicted as a calibration curve having the general form of the representative curve shown at FIG. 8. In this curve the ordinate indicates the load and the abscissa indicates the meter readings.

It is to be noted that this curve may be divided into three portions. First, where the loads are small, the curve is relatively flat indicating comparatively large meter readings for small changes of load or a comparatively high sensitivity of the apparatus. The second portion of the curve concerns the range of loads for which the cell is normally designed to resist. In this portion the curve is steeper and the meter readings are correlated with changes of load to provide for a normal, selected sensitivity of the apparatus. The third portion of the curve concerns loads which exceed the loads for which the cell was designed in normal use. In this portion, the curve is yet steeper indicating comparatively small meter readings for large changes of load and a lower sensitivity of the apparatus.

Figure 8:
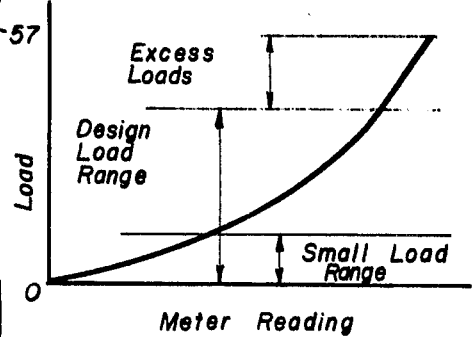
FIG. 8 is a representative calibration curve for an improved load cell indicating, somewhat diagrammatically, the manner in which the calibration curve varies when measuring light loads, design loads and excess loads.

As indicated by the first portion of the curve shown at FIG. 8, a load cell C of a given size is adapted to respond to comparatively light loads, with a sensitivity comparable to that which can ordinarily be attained only with smaller load cells, and thus, the effective range of the cell is substantially increased. This action is brought about because at light loads the pressure of the end caps is against the ridges 32 of the tube ends adjacent to the inner wall of the tube 30 as illustrated at FIG. 5. The net result is to concentrate the deflection within the tube at the inner wall of the tube 30 whereon the strain gages 46 are mounted, and the response to smaller loads is thus greater than would otherwise be possible.

As the load upon the cell increases to the normal range for which the cell is designed, the ends 31 of the tube contact a greater portion of the end cap shoulders 36 due to elastic deformation of both members as in the manner illustrated at FIG. 6. The action of the load cell is then more nearly conventional for the load tube is deflected in a substantially uniform manner instead of concentrating the deflection at the inner surface of the tube wall.

It is desirable, especially in excavation work, to provide a cell construction which can become overloaded without being permanently damaged and which can indicate to some extent, at least, the magnitude of the excess loading. This overload feature is provided in the present construction by a selected clearance $2d$ between the upper end of the connector 40 and the inner face of the stub of the end cap 33 as indicated at FIG. 5. When the load cell is deflected and compressed by a load of a selected magnitude which is, say for example, 125 percent more than the rated load for the cell, the tube 30 and the end caps 33 and 34 are then flexed to a point where the inner face of the stub 35 of the end cap 33 contacts or bottoms against the connector 40 as illustrated at FIG. 7. Thereafter, any additional load upon the cell will be resisted by both the tube 30 and the connector 40. This reduces the comparative deflections of the cell for a given change of load and thus reduces the sensitivity of the readings. It is to be noted that this designated overload range is actually a range of loads for which the cell is designed to resist without overstressing the components of the cell.

The actual spacing between the inner face of the upper end cap stub 35 and the connector 40, as indicated as $1d$ at FIG. 5, can be established by the elastic properties of the materials forming the load cell, so that bottoming of the stub 35 against the connector 40 will occur when the above mentioned selected excess over the rated load is attained. It is to be noted that when the connector is centrally spaced within the cell, the clearance distance $d$, as indicated at FIGS. 5 and 6, will occur at both ends of the cell and the total clearance distance will be $2d$ which would occur at the upper end of the cell if the connector were setting upon the bottom end cap. However, the distance $1d$ is so small that it would be extremely difficult to machine the connector with the necessary degree of accuracy. Accordingly, a procedure is used in the manufacture of the load cell wherein the proper clearances are established by actually preloading the cell to the selected excess over the rated load before the cell is calibrated. By selecting a high strength steel for the load tube 30, for example a material having a yield point in the range of 140,000 p.s.i., it is possible to load the cell C to the point where the pressure of the ends of the load tubes will deform the shoulder portions of the end caps. Then, in the initial manufacture of the load cell, the theoretical distance for the distance $d$ is established by the normal working stresses to be encountered, for example a working stress of 25,000 p.s.i. on the end caps and in the load tube. The length of the connector 40 is machined to be slightly less than its theoretical length, to thereby provide a total spacing slightly greater than the distance $2d$ before preloading of the cell, the excess being a few thousandths of an inch and within the normal variations attainable in a machine shop. The ends of the load tube are sloped at the desired angle, approximately one-half degree, and in the initial assembly the inner ridge 32 at each end of the cell will contact the flat, square cap shoulders 36. By loading the cell to the selected excess over the rated load, and until the end caps tightly bottom against the connector 40 as indicated at FIG. 7, a permanent deformation is formed in the end cap shoulders, appearing as the indentation ring 39 having a width $e$ when the load on the cell is removed, as indicated at FIG. 5. The width of this indentation 39 will vary in different load cells, but it will automatically establish the desired spacing $d$ between each end cap and the load tube with a high degree of precision.

This preloading also causes each shoulder 36 to be inclined slightly from its initial, flat position by yielding to a permanent deformation. The permanent deformation of each end cap which establishes the indentation spacing $e$ and the inclination of the shoulder also establishes the space $d$ between the outer edge of each end cap and the outer edge of the adjacent end of the load tube which varies from a maximum at zero load to zero at the selected excess over the rated load and the sum of the spacings $d$ at the upper and lower ends of the cell is the same as the dimension $2d$ between the cap and the connector. This arrangement provides for the increased sensitivity of the load cell at small loads, normal sensitivity at rated loads and the capability of withstanding excessive loads.

From the foregoing description, it is apparent that alterations and variations may be made in the design of a load cell which will embody the concepts of the present invention.

We claim:

1. In a load cell of the class comprising:
    a short, thick-walled tubelike column adapted to deflect through a selected range responsive to an axially directed, compressive loading;
    a strain gage means on a wall of the column adapted to measure the deflection of the column at the wall to thereby provide an indication of the loading thereupon;
    a flat end cap at an end of the column bearing against the end to receive the compressive loading to bear against and to deflect the column;
    the improvement wherein:
        the end of the column includes a bevel at a small angle with respect to the contacting surface of the end cap to provide a narrow, ringlike ridge adjacent to the said wall whereon the strain gage means is mounted, with the angle of the bevel being selected, by consideration of the elastic properties of the column and end cap, to permit increased surface contact between the end cap the the end of the column as the column and end cap are compressed within their elastic flexure range, responsive to compressive loading on the end cap, whereby the strain gage means measuring flexure of the tube will measure a comparatively large flexure for changing loads at small total loads and comparatively small flexure for changing loads as the total loads are increased to thereby maintain a relatively constant degree of precision when measuring small loads and when measuring heavier loads.

2. In the load cell defined in claim 1, wherein
    said thick walled tubelike column is formed as a tubular member; and
    the strain gage and the ringlike ridge are adjacent to the inner wall thereof.

3. In the load cell defined in claim 1, wherein the angle of the bevel is selected, with respect to the thickness of the tube, to permit the aforesaid increased surface contact between the end cap and the end of the tube as the tube and end cap are compressed within their elastic flexure range and to permit the end of the tube to fully contact the end cap at a selected load.

4. In the load cell defined in claim 3, wherein the yield point strength of said tube is substantially greater than the yield point strength of said caps, and an annular indentation in said cap receiving the ringlike ridge, the indentation being correlated with the angle of the bevel and having a width and depth such that the end of the tube will fully contact the end cap at the aforesaid selected load.

5. In the load cell defined in claim 1, wherein each end cap includes a short, cylindrical stub adapted to extend into the tube with a loose fit and a flat annular shoulder adapted to rest upon the end of the tube when the stub is fitted therewithin.

6. In the load cell defined in claim 1, wherein each end cap includes a short, cylindrical stub, a flat annular shoulder surrounding the stub, an annular groove about the base of the stub and an O-ring seal therein, said stub being adapted to loosely fit into the tube, with the shoulder resting against an end of the tube and with the O-ring sealing and centering the stub within the tube.

7. In the load cell defined in claim 1, including a ring of bolts extending through each end cap and into the connector.

8. In a load cell of the type having:
   a. an outer, thick-walled tube adapted to deflect through a selected range responsive to axially directed compressive forces;
   b. a strain gage means on a wall of the tube adapted to measure the deflection of the tube to thereby provide an indication of the loading upon the tube;
   c. an end cap at each end of the tube, the caps closing the tube and bearing against its ends to receive compressive forces which deflect the tube;
   d. a means to hold the end caps onto the tube;
   e. an inner, thick-walled tube within the outer tube adapted to deflect responsive to axially directed forces and having a length slightly less than the spacing between the opposing surfaces of the end caps when the end caps are bearing against the outer tube before compressive forces are applied thereto, but having a length such that the ends of this inner tube will bear against the end caps when the outer tube has been partially deflected through its selected range of deflection, whereby comparatively lighter loads are indicated on the strain gage by deflection of the outer tube only and comparatively heavier loads are indicated on the strain gage by deflection of both the first and second tubes after the outer tube has deflected to the point where the inner tube bears against the end caps, the improvement which comprises:
   a bevel at a small angle between an end of the outer tube and the contacting surface of the adjacent end cap providing a narrow, ringlike ridge contact of the tube upon the end cap adjacent to the wall of the tube whereon the aforesaid strain gage means is mounted;
   the angle of the bevel being selected by consideration of the elastic properties of the tube and end cap to permit increased surface contact between the end cap and the end of the tube as the tube is compressed within its elastic flexure range responsive to compressive forces on the end cap and to a point where the end of the tube fully contacts the end cap, whereby to permit the strain gage to indicate comparatively large flexures for changing loads at small total loads and comparatively small flexure for changing loads as the total loads are increased, to thereby maintain a relatively constant degree of precision when measuring comparatively small loads and when measuring heavier loads.

9. In the load cell defined in claim 8, wherein said ringlike ridge contact is at the inner wall of the tube.

10. In the load cell defined in claim 8, wherein the ringlike ridge adjacent to the wall of the tube is within an annular indentation in the end cap, having a width and depth correlated with the angle of the bevel, such that the end of the tube will fully contact the end cap at a selected, specified loading.

11. In a load cell of the type having:
   a. an outer, thick-walled tube adapted to deflect through a selected range responsive to axially directed, compressive forces;
   b. a strain gage means on the inner wall of the tube adapted to measure the deflection of the tube to thereby provide an indication of the loading upon the tube;
   c. an end cap at each end of the tube, the caps closing the tube and bearing against its ends to receive compressive forces which deflect the tube;
   d. a means to hold the end caps onto the tube;
   e. an inner, thick-walled tube within the outer tube adapted to deflect responsive to axially directed forces and having a length slightly less than the spacing between the opposing surfaces of the end caps when the end caps are bearing against the outer tube before compressive forces are applied thereto, but having a length such that the ends of this inner tube will bear against the end caps when the outer tube has been partially deflected through its selected range of deflection, whereby comparatively lighter loads are indicated on the strain gage by deflection of the outer tube only and comparatively heavier loads are indicated on the strain gage by deflection of both the first and second tubes after the outer tube has deflected to the point where the inner tube bears against the end caps,
   wherein each end of the tube is bevelled at a small angle to provide a narrow, ringlike ridge thereon adjacent to the inner wall thereof and a small, selected clearance between its outer edges and the adjacent edges of the end caps, which clearance is diminished as an increasing load is applied to the cell to compress the same, and eliminated as the load reaches a selected design maximum and which clearance is substantially the same as the aforesaid selected clearance of said cylindrical member.